Sept. 23, 1969  R. E. TATNALL  3,468,747
TEMPERATURE SENSITIVE ADHESIVE SHEET MATERIAL WITH AN ELECTRIC
HEAT GENERATING GRID EMBEDED THEREIN
Filed April 28, 1965

INVENTOR
ROBERT E. TATNALL

BY *(signature)*

AGENT

United States Patent Office 3,468,747
Patented Sept. 23, 1969

3,468,747
TEMPERATURE SENSITIVE ADHESIVE SHEET MATERIAL WITH AN ELECTRIC HEAT GENERATING GRID EMBEDDED THEREIN
Robert E. Tatnall, Wilmington, Del., assignor to E. I. du Pont de Nemours and Company, Wilmington, Del., a corporation of Delaware
Filed Apr. 28, 1965, Ser. No. 451,420
Int. Cl. B32b 5/18; D03d 11/00
U.S. Cl. 161—79                                11 Claims

ABSTRACT OF THE DISCLOSURE

A temperature sensitive adhesive sheet material having embedded therein an electric heat generating grid for internally generating heat to activate the adhesive components, the adhesive having an electrical conductance significantly less than the conductance of the electrical grid and heat conductance sufficient to substantially uniformly transmit heat from the grid throughout the adhesive is provided for use in forming highly efficient bonds of high temperature adhesives.

---

Figure 1:
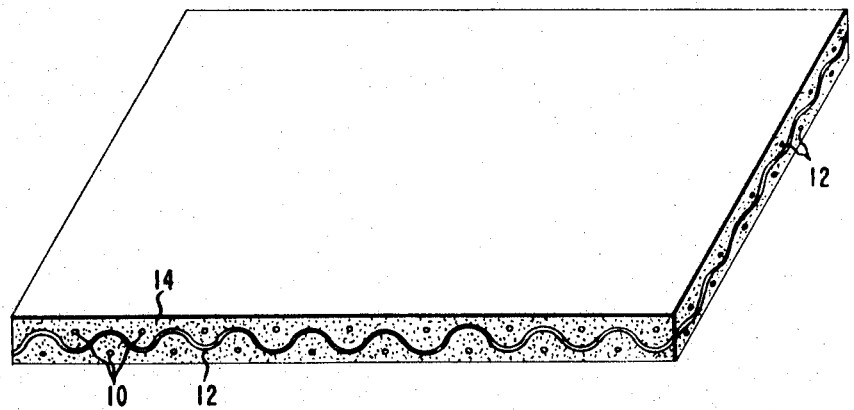

This invention concerns temperature sensitive adhesive sheet materials which internally generate the heat necessary to activate their adhesive properties. These sheet materials can comprise adhesives having activation temperatures exceeding 850° F. and are particularly useful in forming highly efficient bonds of high temperature adhesives. Extensive heating facilities are not necessary to use these sheet materials even when forming bonds of those adhesives which develop their high strength when cured at elevated temperatures. In sheet materials of this invention, these high strength, high temperature adhesives are available in a readily useable form to the home repairman as well as the large corporation.

Developing optimum strength and temperature properties in many thermoplastic or thermosetting adhesives requires holding these adhesives at elevated temperatures for certain periods of time to insure optimum tackiness of thermoplastic adhesives and optimum polymerization of thermosetting adhesives. In the past, temperature sensitive adhesives could be used efficiently only in bonding components which are unaffected by exposure to heat and which have high heat conductivities to aid in transferring heat to the adhesive. Severely limited by these requirements was the utility of the numerous adhesives which require high activation temperatures. Annealing of metals, distortion of large metal sheets, and dehydration and chemical changes of wood products which require long exposure periods because of low heat conductivity are examples of the difficulties encountered in bonding these components.

In some instances ordinary wire screens or screens made entirely of high resistance material were sandwiched into adhesives to provide bond line resistance heating and thereby eliminate the difficulties inherent in transferring heat through the components. Electrical resistance of these screens was approximately the same in both directions. Sheet materials comprising wire screens are not adaptable to shaped bond areas without causing hot spots, are fragile because of the small wire diameters required and also produce hot spots around broken wires and cut out areas. Adhesive burned by hot spots negates most potential advantages of these screen materials especially when temperatures above about 400° F. are required.

This invention provides a temperature sensitive adhesive sheet material which minimizes hot spots by distributing electric power and heat across the width of the material. This sheet material, which is capable of internally generating heat to activate its adhesive properties, comprises:

(A) an electric heat generating grid consisting essentially of a plurality of buss conductors located essentially parallel to each other, a plurality of heat generating conductors interconnecting said buss conductors and located essentially parallel to each other, said grid having an electrical conductance in the direction parallel to said buss conductors at least about 20 times greater than the electrical conductance in the direction parallel to said heat generating conductors, and (B) a temperature sensitive adhesive in heat conducting contact with said grid, said adhesive having an electrical conductance substantially less than the minimum conductance of said grid and a heat conductance sufficient to transmit heat from said grid throughout said adhesive.

Values of electrical conductance used in this invention are measured on squares of grids or adhesive. The term "activation" is used in this specification to describe the operation by which bonding properties of a potentially adhesive material are realized. For thermoplastic materials such as polyesters, activation is accomplished by heating the material to a plastic or tacky stage followed by cooling to the solid stage. Thermosetting materials such as phenol-formaldehyde are activated by heating the material to a temperature at which polymerization rapidly takes place.

Figure 2:
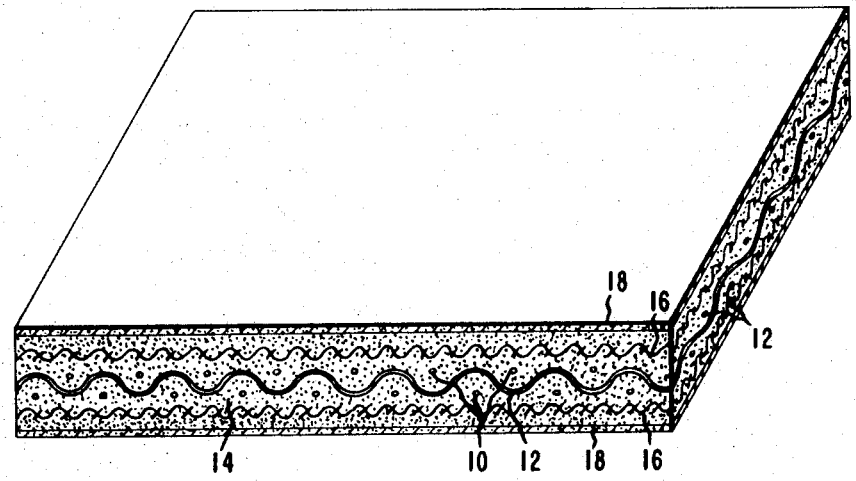

Two embodiments of sheet materials of this invention are shown in the drawings. FIGURE 1 is a cross sectional view of a basic sheet material and FIGURE 2 is a cross sectional view of a more preferred sheet material having several additional features. Sheet material thickness in both of these figures is exaggerated for clarity.

In the drawings, buss conductors 10 are interwoven with heat generating conductors 12 to form a grid which is encapsulated in a temperature sensitive adhesive 14. Sheet materials of this invention in which the grid is coated on one side with adhesive are useful in many applications. However, encapsulation of the grid in the adhesive is preferred because stronger bonds can be formed. This bond strength increase results partially from improved heat distribution and decreased grid oxidation. Encapsulated grid sheet materials are also more versatile since the adhesive composition does not have to flow through the grid during activation, grids are less susceptible to damage, and the adhesive provides built-in electrical insulation of the grid from the components being bonded.

Electrical power is supplied to materials of this invention by penetrating the adhesive with the heated teeth of spring clamps to make contact wiht the buss conductors. The buss conductors distribute power across the grid width to equalize heat production, even when the grid contains holes or broken conductors. Grids having an electrical conductance in the direction of the buss conductors greater than about 100 times the electrical conductance in the direction of the heat generating conductors have an extremely high power distributing ability; increased bond uniformity and strength result from this high power distribution. To allow electrical connection without interfering with the bond area, a portion of material in excess of that required for the bond along the edges which parallel the buss wires is provided when shaping the material. If desired, buss conductors can be exposed for electrical contact by removing adhesive along the appropriate edges with solvent, or strips of metallic foil can be incorporated in the sheet material at connection points.

Electrical power requirements for activating sheet materials of this invention depend primarily on the activation temperature of the adhesive used and on the desired warmup rate. Once activation temperature is attained the power required decreases since only compensation for heat required in the activation reaction, if any, and heat dissipation through the substrates being bonded and through the surrounding atmosphere is necessary. A fraction of a kilowatt-hour of power per square inch of sheet material is usually sufficient to activate sheet materials of this invention. Rapid warmup is usually desirable when bonding heat sensitive components. Power can be supplied to sheet materials of this invention at rates sufficient to cause temperature increases exceeding 300° F. per minute without damaging adhesive or grid.

Wire grids for the sheet materials of this invention can be prepared by weaving fine heat generating wires made of Nichrome, other nickel-chromium alloys, nickel-iron alloys, nickel-iron-chromium alloys, titanium, etc. with buss wires made of copper, copper alloys, aluminum, silver, tungsten, tin, iron, etc. Grids in which the heat generating wires are made of materials having resistivities greater than about 80 microhms per centimeter cube and the buss wires are made of materials having resistivities less than about 20 microhms per centimeter cube are preferred in this invention because of potentially excellent combinations of wire size, power distributing ability and heat generating ability. Sheet materials of this invention in which the grids have an open area of about 84–97% are capable of producing bonds of optimum strength. Wire grids having these properties can be purchased from the Unique Wire Weaving Company, Hillside, N.J.

Adhesives useful in this invention can be of the thermosetting or thermoplastic type. Typical thermosetting adhesives are the polyamic acids (which cure to polyimides) prepared in accordance with the disclosures of U.S. Patents 3,179,614; 3,179,633; and 3,179,634 and U.S. patent applications Chalmers, Ser. No. 320,819 filed Nov. 1, 1963; and Chalmers et al., Ser. No. 320,937, filed Nov. 1, 1963, both now abandoned. The disclosures of these patents and applications are hereby incorporated into this specification. In general, these polyamic acids are prepared by reacting a diamine with a tetracarboxylic dianhydride in a solvent at a temperature below about 60° C. A coating of the polyamic acid solution is applied to a heat generating grid and the resulting structure is heated to less than about 150° C. to drive off most of the solvent. Resulting is a sheet material of this invention which is non-tacky at room temperature and which produces a strong polyimide bond when cured at temperatures above about 150° C. Sheet materials of this invention which are non-tacky at room temperature are preferred for reasons including ease of handling. Aromatic polyamic acid adhesives, especially polyamic acids made from excess 4,4'-diaminodiphenylether or 4,4'-diaminodiphenylmethane and benzophenone tetracarboxylic dianhydride produce bonds having excellent strength at elevated temperatures.

Other useful thermosetting adhesives include phenol-formaldehyde, urea-formaldehyde, melamine-formaldehyde, resorcinol-formaldehyde, aromatic polyamides, epoxy polyamides, epoxy phenolics, silicone phenolics, polybenzimidazoles, etc.

Thermoplastic adhesives useful in this invention include aliphatic polyamides, polyamide-imides, cellulose esters such as cellulose acetate, cellulose ethers, acrylic esters such as polymethylmethacrylate, polyvinyl acetate, polyvinyl chloride, polyvinyl alcohol, polyethylene, polypropylene, polystyrene, etc. Polyimides prepared from stoichiometric amounts of diamine and tetracarboxylic dianhydride are also useful thermoplastic adhesives. Sheet materials of this invention having thermoplastic adhesives are particularly useful in applications requiring a temporary bond since reconnection of the sheet material to a power source softens the adhesive and allows the bonded components to be separated.

Heat conductivity of the adhesives used in this invention can be increased by dispersing particles having higher heat conductivities throughout the adhesive composition. These particle containing adhesives are particularly useful when activation temperatures above about 600° F. are contemplated. Tensile strength of bonds formed with sheet materials of this invention which comprise adhesives containing such particles is usually greater than homogeneous adhesives because of improved heat distribution. These particles can be silver, copper, aluminum, tin, iron, nickel-chromium alloys, nickel-iron alloys, nickel-iron-chromium alloys, nickel-copper alloys, copper-tin alloys (bronze), carbon, etc. Particle containing adhesives useful in this invention in which the particles are electrical conductors have varying amounts of electrical conductivity depending on the proportion of particles to adhesive. By selecting proportions so the adhesive mixture as well as the grid electrically generates heat results in additional improvements in heat distribution of sheet materials of this invention. Proportions of particles to adhesive useful in this invention can exceed 45% by weight. Sheet materials capable of forming the strongest bonds generally contain particles having average dimensions less than about 100 microns.

By including a porous electrically insulating sheet material on one or both sides of the heat generating grid the possibility of short circuiting the grid by metallic components being bonded is minimized. Typical insulating sheet materials include glass cloth, polyamide fibrid paper such as the paper disclosed in U.S. Patent 2,999,788, etc. Bond strength is usually increased by including these materials because of decreased adhesive burning and insufficient activation caused by short circuiting.

FIGURE 2 shows a sheet material of this invention which comprises a porous insulating sheet material 16 positioned on each side of the grid and encapsulated in adhesive 14. Encapsulation is accomplished by dipping the grid and porous sheet assembly in a solution of adhesive or by brushing a solution of adhesive on the assembly and removing the solvent. A topcoat 18 of the adhesive can be applied, if desired, to the sheet material to further improve electrical insulation and to insure 100% contact of adhesive with the components being bonded. Ordinarily sheet materials of this invention are produced in thicknesses up to a maximum consistant with good bond thickness. Most of these can be cut and trimmed to the desired size and shape with an ordinary scissors. More forceful cutting means such as a heavy duty shears or a saw readily cut thicker sheet materials of this invention.

In the following example all parts and proportions are by weight unless otherwise noted.

EXAMPLE

A wire grid is made by weaving 0.004 inch diameter copper wires with groups of three 0.002 inch diameter Nichrome wires. The copper wires are spaced about $1/16$ inch apart and the groups of Nichrome wires are spaced about $1/8$ inch apart. Where the Nichrome wires cross the copper wires, the two outside Nichrome wires of each group are on one side and the middle Nichrome wire is on the opposite side of the copper wire. This arrangement holds the wires in place. Weight of the resulting grid is about 1.75 ounces per square yard and the grid has an open area of about 95%.

Glass cloth having 39 fill threads per inch and 40 warp threads per inch which weighs about 2.12 ounces per square yard is stretched on a wooden frame, the wire grid is laid over this glass cloth, and a second sheet of glass cloth is stretched over the grid.

About 29.7 parts of 4,4'-diaminodiphenylmethane is dissolved in about 95 parts of N-methylpyrrolidone in a 3 neck round bottom flask fitted with stirrer, nitrogen inlet and reflux condenser. Under a nitrogen atmosphere stirring is started and about 33.6 parts of 3,3',4,4'-benzophenone tetracarboxylic dianhydride is added. The resulting mixture contains about 50 mole percent excess of 4,4'-diaminodiphenylmethane. During the addition the temperature of the mixture rises to about 50–55° C. The mixture is stirred at this temperature for about 30 minutes after the addition is completed resulting in a 40% solids solution. This solution is diluted to about 30% solids with a 3:1 mixture of xylene and N-methylpyrrolidone.

About 149 parts of aluminum powder having an average particle size of 5 microns is uniformly dispersed into about 596 parts of this polyamic acid solution. A coating of the resulting dispersion is applied to each side of the above glass cloth-wire grid sandwich and is allowed to permeate the sandwich before being dried for 15 minutes at 200° F. Three more coats of the polyamic acid solution are then applied to each side with a 15 minute drying period (at 200° F.) after each coat. The resulting sheet material is about 16 mils thick, weighs about one pound per square yard and is about 59% by weight polyamic acid.

A 2 x 4½ inch piece of this sheet material (the 2 inch dimension is parallel to the copper buss wires) is placed between a 2 x 4 inch sheet of 18 gauge aluminum and a 2 x 4 inch piece of aluminum honeycomb. Wall thickness of the honeycomb is about 4–5 mils. A compressive load of about 180 pounds is applied to this structure. Electrical power supplied at a rate of about 56 watts per square inch (30 volts DC, 15 amperes) heats the sheet material to 550° F. in about 90 seconds. About 25 watts per square inch (20 volts DC, 10 amperes) maintains this temperature for about 5 minutes to cure the polyamic acid to polyimide. Average tensile shear strength of this bond exceeds 1800 p.s.i. at 25° C. and 1400 p.s.i. at 300° C.

What is claimed is:

1. A temperature sensitive adhesive sheet material capable of internally generating heat to activate its adhesive properties which comprises:
    (A) an electric heat generating grid consisting essentially of a plurality of buss conductors located essentially parallel to each other, a plurality of heat generating conductors interconnecting said buss conductors and located essentially parallel to each other, said grid having an electrical conductance in the direction parallel to said buss conductors at least about 20 times greater than the electrical conductance in the direction parallel to said heat generating conductors, and
    (B) a temperature sensitive adhesive in heat conducting contact with said grid, said adhesive having an eletrical conductance substantially less than the minimum conductance of said grid and a heat conductance sufficient to transmit heat from said grid throughout said composition.

2. The sheet material of claim 1 in which said grid is encapsulated in said adhesive.

3. The sheet material of claim 2 in which said adhesive contains dispersed particles having a heat conductivity greater than said adhesive.

4. The sheet material of claim 3 which comprises a porous electrically insulating sheet material on one side of said grid and encapsulated in said adhesive.

5. The sheet material of claim 4 which comprises a porous electrically insulating sheet material on each side of said grid with both insulating sheet materials encapsulated in said adhesive.

6. The sheet material of claim 5 which has a top coating of adhesive in heat conducting contact with said particle containing adhesive.

7. The sheet material of claim 6 in which said adhesive is a polyamic acid.

8. The sheet material of claim 2 which comprises a porous electrically insulating sheet material on one side of said grid and encapsulated in said adhesive.

9. The sheet material of claim 1 in which said adhesive contains dispersed particles having a heating conductivity greater than said adhesive.

10. The sheet material in claim 1 in which said adhesive is a polyamic acid.

11. The sheet material of claim 1 in which the electrical conductance of the heat generating conductors is less than about $\frac{1}{100}$ of the conductance of the buss conductors.

References Cited

UNITED STATES PATENTS

| 2,393,100 | 1/1946 | Gallay et al. | 156—275 |
| 2,710,909 | 6/1955 | Logan et al. | |
| 2,884,509 | 4/1959 | Heath. | |
| 2,900,290 | 8/1959 | Bethge | 161—98 XR |
| 2,938,992 | 5/1960 | Crump | 219—528 |

FOREIGN PATENTS

| 8,398 | 1/1897 | Great Britain. |

OTHER REFERENCES

APC Ser. No. 229,798, May 11, 1943 Baseler et al., Class 156-275.

ROBERT F. BURNETT, Primary Examiner

W. A. POWELL, Assistant Examiner

U.S. Cl. X.R.

161—87, 89, 93, 96, 98, 162, 167; 156—275; 219—529